Sept. 14, 1948.

K. POSNER
NOW BY CHANGE OF NAME
J. K. POWER
APPARATUS FOR MANUFACTURING
AND FILLING CAPSULES

Filed July 6, 1945

INVENTOR
KURT POSNER,
NOW BY CHANGE OF
NAME,
JOHN KENNEDY POWER
By
his Attorney

FIG. 2.

Sept. 14, 1948.  K. POSNER  2,449,139
NOW BY CHANGE OF NAME
J. K. POWER
APPARATUS FOR MANUFACTURING
AND FILLING CAPSULES
Filed July 6, 1945  8 Sheets-Sheet 3

INVENTOR
KURT POSNER,
NOW BY CHANGE OF NAME,
JOHN KENNEDY POWER
By
h.; Attorney

Sept. 14, 1948.

K. POSNER
NOW BY CHANGE OF NAME
J. K. POWER
APPARATUS FOR MANUFACTURING
AND FILLING CAPSULES 2,449,139

Filed July 6, 1945

INVENTOR
KURT POSNER,
NOW BY CHANGE OF
NAME,
JOHN KENNEDY POWER

By his Attorney

Sept. 14, 1948.  K. POSNER  2,449,139
NOW BY CHANGE OF NAME
J. K. POWER
APPARATUS FOR MANUFACTURING
AND FILLING CAPSULES Filed July 6, 1945  8 Sheets-Sheet 5

INVENTOR
KURT POSNER,
NOW BY CHANGE OF
NAME,
JOHN KENNEDY POWER
By
his Attorney

Sept. 14, 1948.
K. POSNER
NOW BY CHANGE OF NAME
J. K. POWER
APPARATUS FOR MANUFACTURING
AND FILLING CAPSULES

2,449,139

Filed July 6, 1945

INVENTOR
KURT POSNER,
NOW BY CHANGE OF
NAME,
JOHN KENNEDY POWER
By
His Attorney

Sept. 14, 1948.    K. POSNER    2,449,139
NOW BY CHANGE OF NAME
J. K. POWER
APPARATUS FOR MANUFACTURING
AND FILLING CAPSULES Filed July 6, 1945    8 Sheets-Sheet 8

INVENTOR
KURT POSNER,
NOW BY CHANGE
OF NAME,
JOHN KENNEDY POWER
By
his Attorney

Patented Sept. 14, 1948

2,449,139

UNITED STATES PATENT OFFICE 2,449,139

APPARATUS FOR MANUFACTURING AND FILLING CAPSULES

Kurt Posner, London, England, now by change of name John Kennedy Power

Application July 6, 1945, Serial No. 603,542
In Great Britain July 8, 1944

6 Claims. (Cl. 18—5)

The present invention relates to a means for manufacturing and filling containers, more particularly, but not exclusively, capsules.

It is an object of the present invention to provide a means for manufacturing containers, such as capsules, of any suitable plastic material, for example gelatine, cellulose derivatives such as esters or ethers, polymerization products, or the like.

It is another object of the invention to provide a means for filling the capsules or the like while being manufactured, for example, with a liquid, paste or powder, such as therapeutical, cosmetic, or the like preparations, or with liquid fuel for pyrophoric lighters, or foodstuff.

It is a further object of the invention to provide means for marking the capsules or the like while being manufactured, for example by embossing or engraving a brand on the outer walls of the capsules or the like or attaching a label thereto.

It is still another object of the invention to prevent igniting during the filling process of the material to be filled into the containers, if such material is inflammable as in the case of lighter fuel.

It is still a further object of the invention to enable the manufacture of a string of interconnected filled containers adapted to be easily severed from one another manually or automatically, for example by a dealer when selling such containers.

Other objects and advantages of the present invention will become apparent to those skilled in the art from the following specification when read in connection with the accompanying drawings in which.

In all the drawings the same parts are indicated by the same reference numerals.

Figure 1:
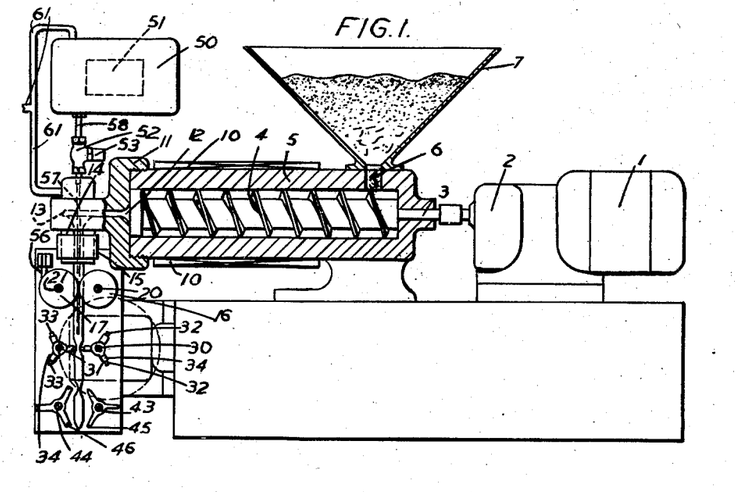
Fig. 1 is a general side view, partly in section of a first continuously operating embodiment of the invention as applied to the manufacture of and filling of capsules.
Figure 2:
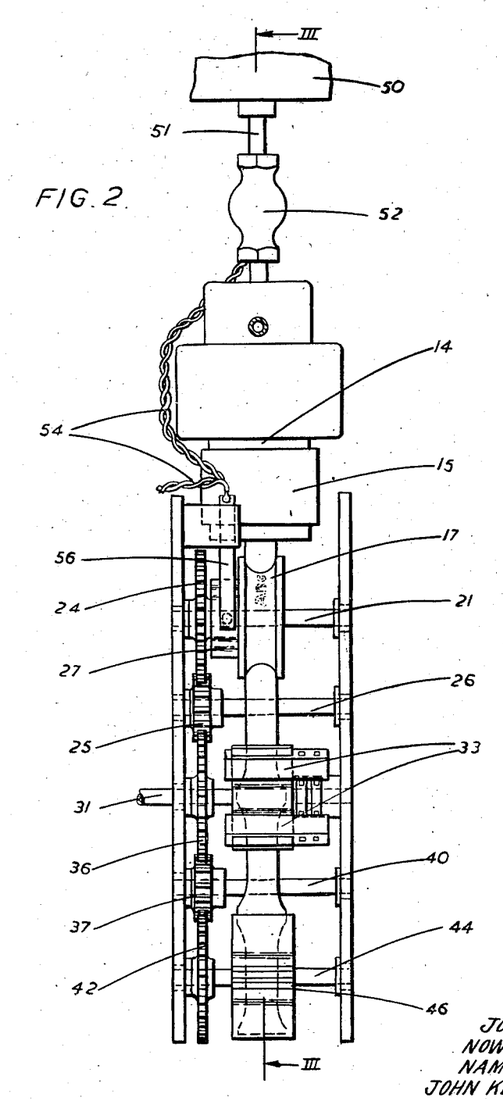
Fig. 2 is an enlarged front view of part of the embodiment shown in Fig. 1.
Figures 3, 5:
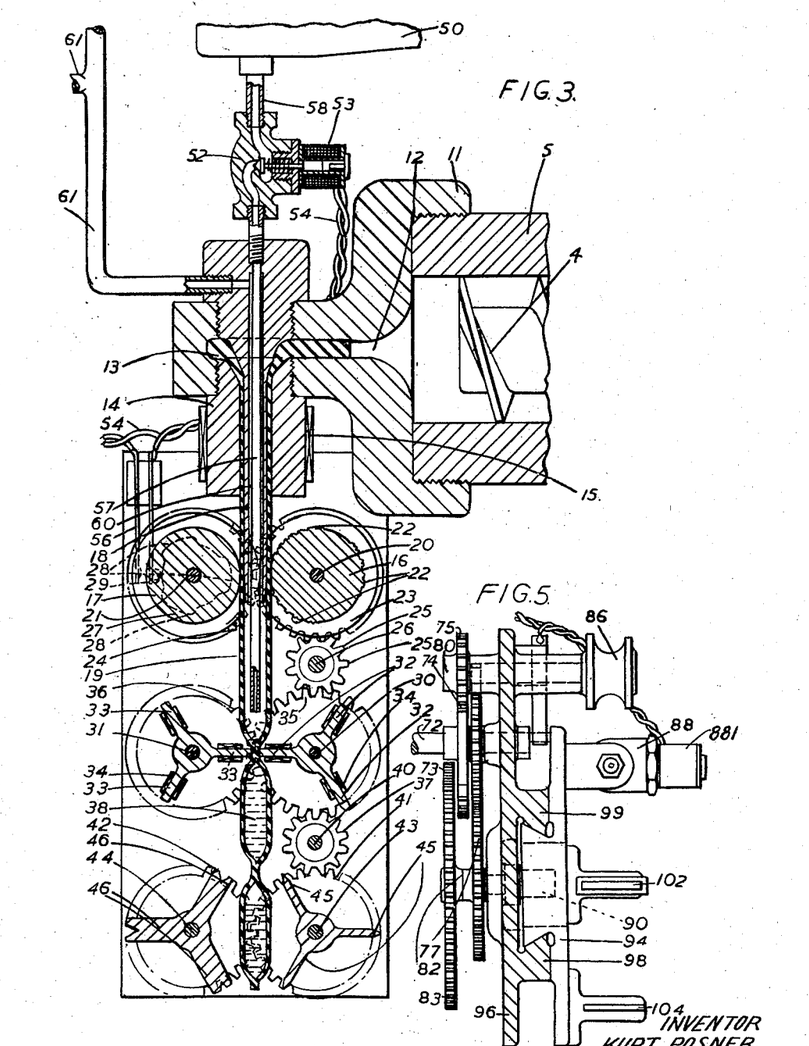
Fig. 3 is a sectional view along the lines III—III of Fig. 2.
Fig. 5 is a section along the lines V—V of Fig. 4.

Referring first to Figs. 1, 2 and 3, the arrangement comprises an extruding mechanism for continuously manufacturing a tube made of plastic material, a capsule forming mechanism, and a filling mechanism. The extruding mechanism includes a motor 1 coupled through a reduction gear 2 to a shaft 3, carrying a helical screw 4 axially arranged in a cylinder 5. Near one of its ends, the cylinder 5 has an inlet 6 communicating with the interior of a hopper 7. A heater 10 is provided for heating the cylinder 5. Preferably, the heater 10 is an electric heater. At the other end, the cylinder 5 is closed by a cap 11 having a central orifice 12 merging into an annular nozzle 13 provided in a nozzle member 14 which is provided with a tubular mandrel 18 extending downwards. The nozzle member 14 is adapted to be heated by a heater 15 which is preferably an electric heater.

The capsule forming mechanism includes two co-operating guide rollers 16 and 17 arranged near the lower end of the mandrel 18 and rigidly mounted on rotatable shafts 20 and 21 respectively. The roller 16 may be embossed or engraved as indicated at 22 for the purpose explained further below. A gear wheel 23 is rigidly mounted on the shaft 20 and meshes with a gear wheel 24 rigidly mounted on the shaft 21 and a further gear wheel 25 rigidly mounted on a rotatable shaft 26. A cam 27 is rigidly mounted on the shaft 21 for the purpose explained further below. The cam 27 is provided with three cam surfaces 28 adapted to co-operate with a finger 29. Squeezing tools 32 and 33 are rigidly mounted on rotatable shafts 30 and 31 respectively, each of the tools being provided with a heater 34, which is preferably an electric heater. On shaft 30 there is also mounted a gear wheel 35 meshing with the gear wheel 25 on shaft 26, a gear wheel 36 mounted on shaft 31 and a further gear wheel 37 mounted on a shaft 40. The gear wheel 37 also meshes with a gear wheel 41, which in turn meshes with a gear wheel 42, the gear wheels 41 and 42 being rigidly mounted on rotatable shafts 43 and 44 respectively. On the shaft 43, cutting tools 45 are rigidly mounted which co-operate with complementary cutting tools 46 mounted on the shaft 44. As indicated in Fig. 2, the shaft 31 is extended for being driven either by a second motor (not shown) or through a suitable transmission or gear (not shown) by the motor 1.

The filling mechanism includes a container 50 for receiving a liquid or other material with which the capsules are to be filled. If the filling material is inflammable, for example if the capsules are to be filled with liquid fuel for pyrophoric lighters, a cooling device 51 of any known construction is provided in the tank 50. If the filling material is not inflammable, the cooling device 51 may be omitted. The tank 50 has an outlet 58 leading to a valve 52 which is normally closed, but may be opened under the action of an electromagnet 53 when energized. The electromagnet 53 is connected to an electric supply source (not shown) by means of electric conductors 54 and a switch 56 adapted to be operated by the cam 27 referred to above. From the valve 52 a tubular stem 57 passes through the mandrel 18 in the nozzle member 14 coaxially therewith downwards near to the squeezing tools 32 and 33, the stem 57 being open at its lower end. The outer wall of the stem 57 forms, with the inner coaxial walls of the nozzle member 14 and of the tubular mandrel 18, a passage 60 which communicates with a duct 61 leading to the interior of the container 50 and to a source of compressed air (not shown) such as a compressor.

Figures 7, 18, 19, 20, 22:
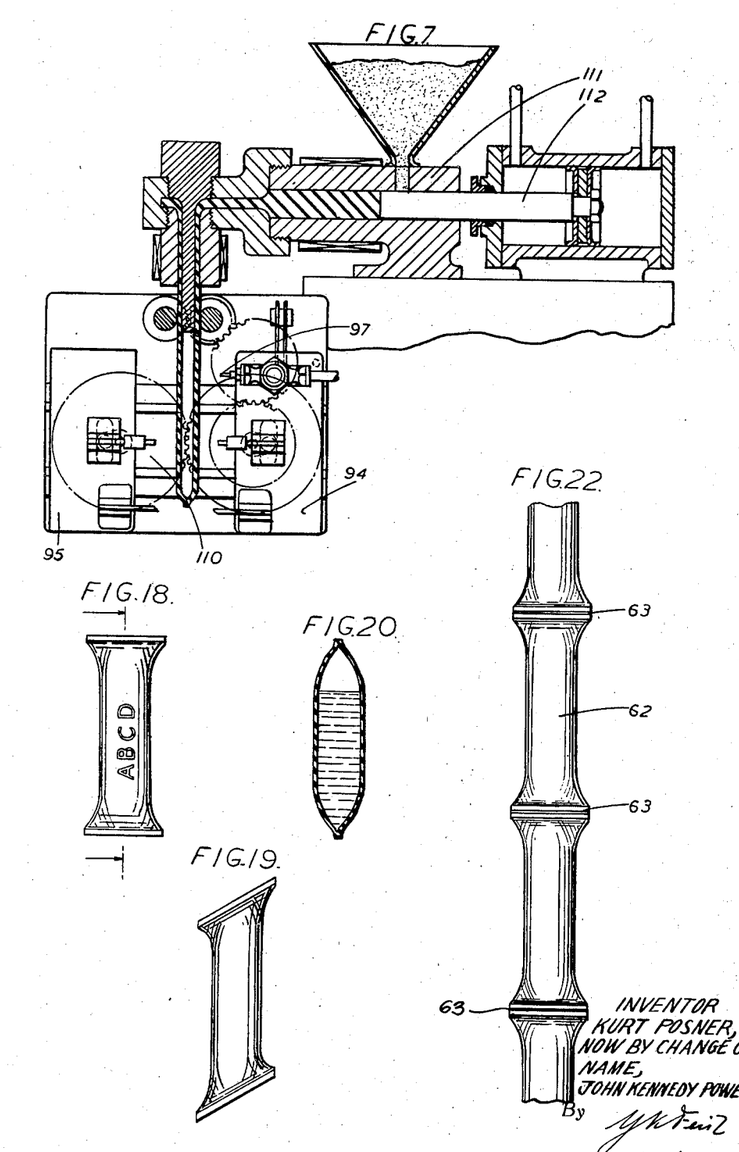
Fig. 7 is a general sectional view of an intermittently operating embodiment somewhat similar to that shown in Figs. 4 to 6, but combined with a mechanism for extruding a tube intermittently while the capsules are manufactured.
Figs. 18, 19 and 20 show a front, back, and sectional view respectively of a capsule manufactured in accordance with the invention.
Fig. 22 shows part of a string of interconnected capsules manufactured in accordance with the invention.

The arrangement described operates as follows: Comminuted plastic material is placed into the hopper 7, the motor 1 is started, the shaft 31 is driven to rotate continuously, the electromagnet 53 is connected to an electric supply source by means of the electric conductors 54, and the heaters 10, 15, 34 and the cooling device 51, if provided, are operated. The motor 1 drives the helical screw 4 continuously in such a direction that the plastic material reaching the cylinder 5 through its inlet 6 is conveyed towards the orifice 12. On its passage through the cylinder 5, the plastic material is heated by the heater 10 and thereby softened. The softened material is, on further rotation of the helical screw 4, pressed into the annular nozzle 13 in the nozzle member 14. While passing through the nozzle member 14, the material is kept hot and soft by the heater 15 and is extruded downwards from the nozzle member 14 around the mandrel 18. The material now cools down and solidifies so as to form a tube as indicated at 19 in Fig. 3. The tube 19 on its passage downwards is gripped and guided by the rollers 16 and 17, the roller 16 rotating in an anti-clockwise, and the roller 17 in a clockwise direction in Figs. 1 and 3. The embossed or engraved parts 22 of the roller 16 engrave or emboss respectively a suitable mark, for example, a brand or the like, on the outside of the tube 19 which is still of sufficient plasticity for this purpose. Alternatively, the embossed parts 22 may be provided with ink from any known and suitably arranged inking device (not shown) so as to imprint a suitable marking on the tube, as indicated in Figs. 2 and 18, or the roller 16 may attach a label to the tube in any known manner. The tube then passes between the rotating squeezing tools 32 and 33, the tools 32 rotating in an anti-clockwise, and the tools 33 in a clockwise direction. These tools are heated by the heaters 34 and squeeze together and thereby close the tube under heat and pressure at predetermined distances along the length of the tube. In Figs. 1 and 3, one set of tools 32 and 33 is shown in its closest position in which the tube has just been squeezed together and closed. On further rotation, the tools 32 and 33 of this set recede from each other, while the tube continues to pass downwards. The tools 32 and 33 of the next set approach each other and, on reaching their closest position, squeeze together and close the tube at a predetermined distance from the preceding closure. Figs. 1 and 2 show three regions at which the tube has been squeezed together and closed. While the tools 32 and 33 shown in Figs. 1 and 3 in their closest position recede from each other, and the tube continues to pass downwards, a cam surface 28 of the cam 27 which rotates bodily with the shaft 21 engages the finger 29 which is moved downwards whereby the switch 27 is closed. Thereby, the electromagnet 53 is energized until on further rotation of the cam 27 the finger 29 is disengaged from the respective cam surface 28. While the electromagnet 53 is energized, the valve 52 is opened and liquid or other filling material is discharged from the container 50 under the action of gravity, passes down the tubular stem 57 into the tube 19, and rests on the closed part of the tube 19. The amount of liquid or the like discharged from the tank 50 can be pre-adjusted by suitably dimensioning the cam surfaces 28 and controlling the rotational speed of the shaft 31. In order to prevent the tube 19 from collapsing, compressed air is injected into the tube 19 from a source of compressed air (not shown) through the pipe 61 and the passage 60. To enable the liquid or the like discharged from the tank 50 to overcome the excess pressure in the tube 19, compressed air is also fed through the pipe 61 into the tank 50. After the tube has been filled with the required amount of liquid or the like as indicated at 38 in Fig. 3, the tube is squeezed together and closed by the next set of tools 32 and 33, whereupon the cycle of operation is repeated. The tube, on further descending reaches the complementary rotating cutting tools 45 and 46, the tools 45 rotating in an anti-clockwise, and the tools 46 in a clockwise direction. The cutting tools 45 and 46 are arranged with respect to the squeezing tools 32 and 33 so that they cut the tube 19 at the regions where the tube has previously been squeezed together and closed. The cutting tools may be constructed so that they sever the tube 19 completely, whereby individual capsules are manufactured which are filled with a liquid or the like and are illustrated in different views in Figs. 18, 19 and 20. Alternatively, the cutting tools 45 and 46 may be so arranged that they do not sever the tube 19 completely, but merely indent or score or perforate it, whereby a string of interconnected capsules is manufactured, the capsules being, again, filled with a liquid or the like. Part of such a string 62 of interconnected capsules is illustrated in Fig. 22, the indentations or the like, being indicated at 63. Owing to the indentations or the like, the individual capsules may easily be severed from one another, for example manually by a dealer when selling such capsules, or automatically.

If the filling material discharged from the tank 50 is inflammable, as for example in the case of liquid fuel for pyrophoric lighters, the danger exists that the material ignites when passing through the nozzle member 14 which is heated by the heater 15. To overcome this difficulty, the cooling device 51 is provided in the tank 50. The cooling device 51 pre-cools the filling material to such a degree that when it passes through the heated nozzle member 14 and its temperature rises, the temperature of the filling material remains well below its critical temperature at which it ignites.

It will be appreciated that with the arrangement illustrated in Figs. 1, 2 and 3, the tube of plastic material is continuously passed through the capsule forming mechanism, the tube being continuously extruded while the capsules are formed and filled.

Figure 4:
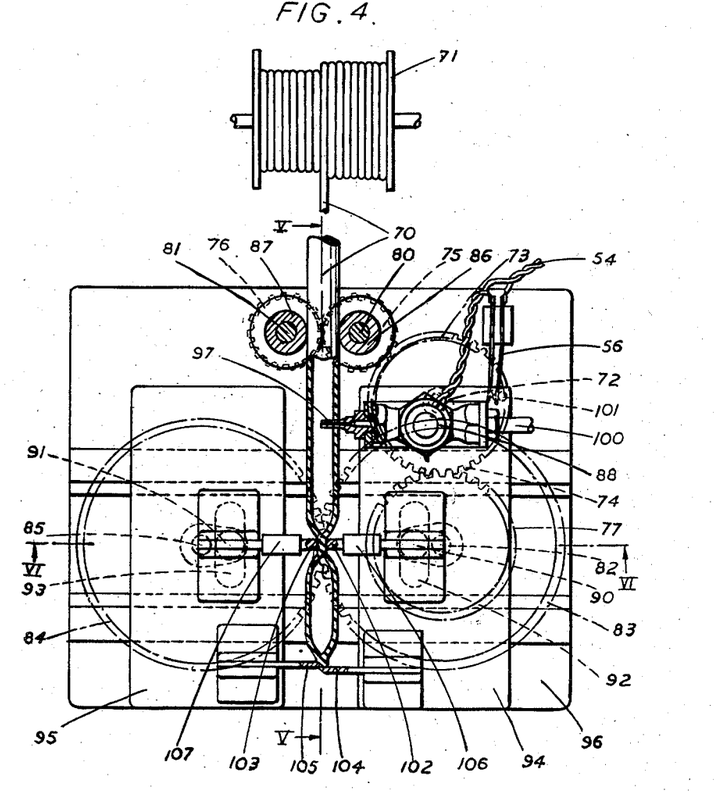
Fig. 4 is a side view, partly in section, of a modification operating intermittently and enabling the capsules to be made from a pre-manufactured tube, a storing device for the said tube being shown on a somewhat reduced scale.
Figure 6:
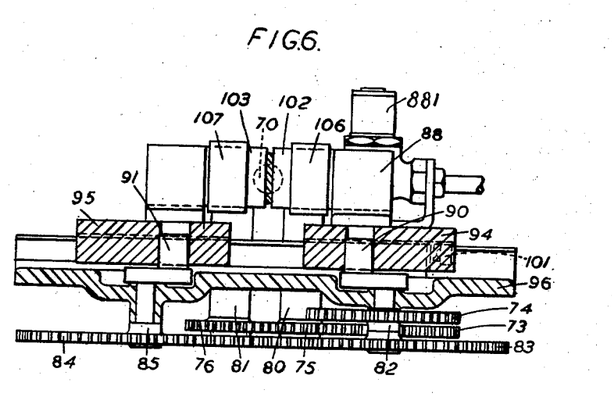
Fig. 6 is a section along the lines VI—VI of Fig. 4.
Figure 23:
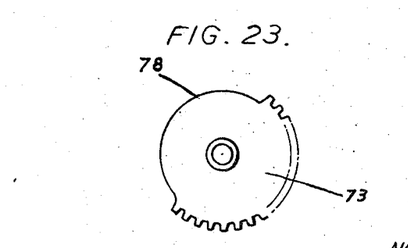
Fig. 23 shows a detail of the arrangement shown in Figs. 4, 5 and 6.

Figs. 4, 5 and 6, which will now be described, illustrate an arrangement in which the tube of plastic material is passed through the capsule forming mechanism intermittently, the capsules being formed from a pre-manufactured tube 70 which is fed to the capsule forming mechanism from a storage device 71 illustrated in Fig. 4 on a somewhat reduced scale. The capsule forming mechanism includes a rotatable shaft 72 continuously driven by any suitable drive (not shown). Two gear wheels 73 and 74 are rigidly mounted on, and rotated with, the shaft 72. The gear wheel 73 has, along its circumference, a section 78 which is free of teeth (see Fig. 23). The toothed section, when in proper position, of the gear wheel 73 meshes with a gear wheel 75. The gear wheels 75 and 76 are rigidly mounted on shafts 80 and 81 respectively. The gear wheel 74 meshes with a gear wheel 77 rigidly mounted on a rotatable shaft 82, on which a further gear wheel 83 is fixed which meshes with a gear wheel 84 rigidly mounted on a shaft 85. On the shafts 80 and 81 guide rollers 86 and 87 respectively are rigidly mounted, the shape of the guide roller 87 being the same as that of the guide roller 86 shown in Fig. 5. The shafts 82 and 85 carry eccentrically arranged studs 90 and 91 respectively. The stud 90 engages a slot 92 and the stud 91 a slot 93 in plates 94 and 95 respectively. The frame 96 of the arrangement is provided with undercut lugs 98 and 99 forming a guide between them in which the plate 94 is reciprocatably mounted as indicated in Fig. 5. The plate 95 is reciprocatably mounted in a corresponding manner. On the plate 94 there is rigidly mounted a hollow piercing device 97, forming part of the filling mechanism, the interior of the piercing device 97 communicating with the outlet 100 of a tank (not shown) for the filling material. The outlet 100 is adapted to be opened by valve 88 operated by an electromagnet 881. At its back, the plate 94 carries a stud 101 adapted to operate the switch 56 which is identical with the switch 56 of Figs. 1 to 3. The plates 94 and 95 carry squeezing tools 102 and 103 respectively and cutting tools 104 and 105 respectively. The squeezing tools 102 and 103 are heated by heaters 106 and 107 respectively.

The arrangement operates as follows: When the shaft 72 is rotated continuously, the gear wheels 75 and 76 are rotated intermittently, rotation taking place only when the gear wheel 75 meshes with the toothed section of the continuously rotating gear wheel 73. The leading end of the pre-manufactured tube 70 of plastic material is passed through the space formed between the guide rollers 86 and 87 and is thereupon intermittently drawn from the storage device 71 by the intermittently rotating guide rollers 86 and 87, the roller 86 rotating in an anticlockwise and the roller 87 in a clockwise direction. From the drawings, particularly from Fig. 4, it will easily be seen that the eccentrically arranged stud 90 rotates continuously in an anticlockwise, and the stud 91 in a clockwise direction around the axis of the shafts 82 and 85 respectively, causing the plates 94 and 95 to reciprocate, the plates 94 and 95 moving, at any instant, in opposite direction. Starting, for example, from the position illustrated in Fig. 4, the plates 94 and 95 will recede from each other until the studs 90 and 91 have rotated through angles of 180°, whereupon the plates 94 and 95 will approach each other until they, again, reach their closest position shown in Fig. 4, and so on. The plate 94 carries with it the piercing device 97, the squeezing tool 102, the cutting tool 104, and the stud 101; and the plate 95 the squeezing tool 103 and the cutting tool 105. The arrangement is such that, when the plates 94 and 95 have receded so far from each other that the tools carried by them have cleared the pathway for the tube 70, the rollers 86 and 87 start rotating owing to the gear wheel 75 meshing with the toothed section of the gear wheel 73. A length of the tube 70 is drawn from the storing device 71 and descends through the capsule forming mechanism. The movement continues until the plates have sufficiently approached each other so that the tools would impede the movement of the tube 70. The gear wheel 75 becomes now clear of the toothed section of the gear wheel 73 and comes to rest together with the guide rollers 86 and 87 and the tube 70. When the plates 94 and 95 approach each other further, the piercing device 97 pierces the stationary tube 70 and the heated squeezing tools 102 and 103 commence to squeeze the tube together and close it. When the plates 94 and 95 approach each other still further the stud 101 closes the switch 56, thereby energizing, by means of the electric conductors 54, the electromagnet 881 of the valve 88 in the outlet 100 of the tank for the filling material, thereby causing filling material to be discharged from the tank under the action of gravity through the outlet 100, the valve 88 and the hollow piercing device 97 into the tube 70, where it rests on the previously closed part of the tube 70. When subsequently the plates 94 and 95 recede from each other the stud 101 releases the switch 56, whereby the electromagnet is de-energized and the supply of filling material is interrupted. The arrangement is now ready for the next cycle of operation, during which the tube 70 is squeezed together and closed at a region above the filling material discharged into the tube 70. Thereby, the filling material is entrapped in the tube 70 between the two regions at which the tube has been squeezed together and closed. At each cycle, the squeezing and closing of the tube 70 is effected at that region of the tube 70 which was pierced during the preceding cycle of operation. Thereby, the hole previously pierced in the tube is sealed. During each cycle the cutting tools 104 and 105 sever, indent, score or perforate the tube at the previously closed region, as will easily be understood from Fig. 4. Thus, either separate filled capsules or a string of interconnected capsules is formed as previously explained in detail. Since with this arrangement the filling material has not to pass through any heated nozzle member, the cooling device in the tank may be dispensed with, even if the filling material is inflammable.

Of course, when using the capsule forming mechanism just described, it is not necessary to form the capsules from a pre-manufactured tube but it is possible to extrude the tube intermittently, while the forming of the capsules proceeds. Such an arrangement is illustrated in Fig. 7. In the arrangement of Fig. 7, the capsule forming and filling mechanism generally denoted by numeral 110 is identical with that just described with reference to Figs. 4, 5 and 6, and needs no further explanation except, perhaps, that the plates 94 and 95 are shown in their other extreme position, in which they are most remote from each other. The intermittently acting extruding mechanism which is generally denoted by reference numeral 111 is somewhat similar to the extruding device shown in Figs. 1 to 3, except that the helical screw is replaced by a reciprocating piston 112 which may, for example, be operated hydraulically as illustrated in Fig. 7. Such extruding devices operate intermittently, a predetermined length of the tube being extruded at each stroke of the piston 112. Since such extruding mechanisms are well known per se, and do in themselves not form part of the present invention, it is believed that a detailed description of this mechanism is not necessary.

Figure 8:
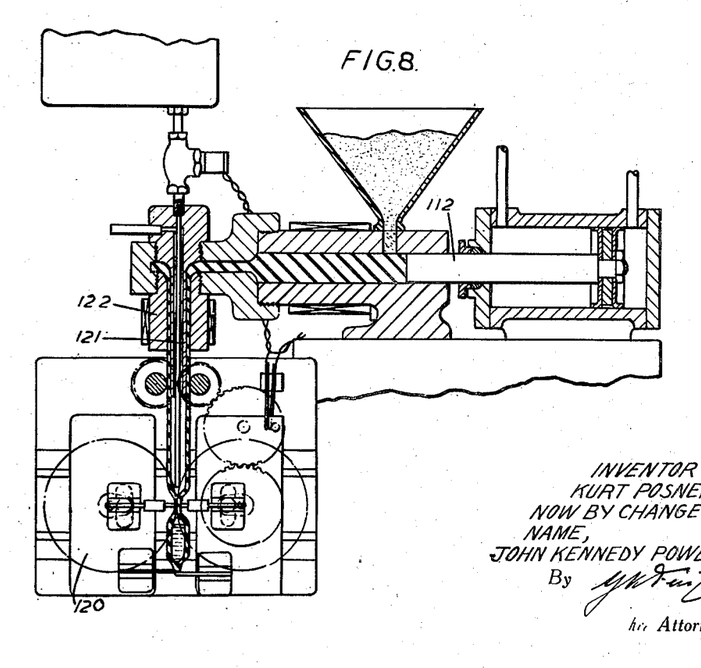
Fig. 8 is a general sectional view of an intermittently operating embodiment somewhat similar to that of Fig. 7, but provided with a filling mechanism similar to that of Figs. 1 to 3.

When the intermittently operating capsule forming mechanism is combined with an intermittently extruding mechanism, as shown in Fig. 7, it is not necessary to fill the tube from its side by means of a hollow piercing device, but the tube may be filled by means of a tubular stem passing through the nozzle member of the extruding mechanism. Such a modification of the arrangement is illustrated in Fig. 8 in which the extruding mechanism 112 is identical with that shown in Fig. 7, and the capsule forming mechanism 120 is substantially identical with the mechanism 110, shown in Fig. 7, except that the hollow piercing device 97 for filling the tube has been omitted. The filling of the tube is effected by means of a tubular stem 121 passing through the nozzle member 122 of the extruding mechanism 112, the arrangement and function of the tubular stem 121 being identical with those of the tubular stem 57 shown in Figs. 1 and 3 and are believed to need no further description.

Figs. 9 to 16, which shall now be described, show a capsule forming mechanism in which the tube is pierced and filled from its side as described with reference to Figs. 4, 5, 6 and 7, but in which the tube passes continuously through the capsule forming mechanism. This is achieved by arranging the piercing device, the squeezing tools, and the cutting tools so that they are able to follow the continuously moving tube, while they work on the tube. The tube itself may be extruded, while the forming of the capsules proceeds, by means of a continuously operating extruding mechanism such as described with reference to Figs. 1, 2 and 3. Alternatively, a pre-manufactured tube may be employed which is continuously drawn from a storage device such as the device 71 shown in Fig. 4. The hollow piercing device 130, a heated squeezing tool 131, and a cutting tool 133 are mounted on a plate 135, and a complementary heated squeezing tool 132 and cutting tool 134 are mounted on a plate 136. The plates 135 and 136 are arranged and adapted to reciprocate so as to recede from each other and to approach each other, and also to move up and down relatively to the frame 137 of the mechanism. For this purpose, the frame 137 is provided with undercut lugs 140 and 141 forming a guide between them in which is slidably mounted a carrier 142. The carrier 142 is likewise provided with upstanding lugs 143, 144 forming a guide between them in which is slidably mounted the plate 135. The plate 136 is slidably mounted on the carrier 142 in a corresponding manner. On a rotatable shaft 145 which is continuously driven by any suitable drive (not shown), a gear wheel 146 is rigidly mounted meshing with a gear wheel 147 rigidly mounted on a rotatable shaft 150. To the shafts 145 and 150 guide rollers 151 and 152 respectively are fixed, the shape of the guide roller 152 being identical to that of the guide roller 151 shown in Fig. 10. On the shaft 145, a cam 153 is rigidly mounted which bears against a roller 154 carried by a shaft 155 attached to the carrier 142 and passing through a slot or the like 156 in the frame 137. Resilient means, such as springs 157 urge the carrier 142, and therewith the roller 154, upwards so that the roller 154 bears against the cam 153. Resilient means, such as springs 160 and 161 urge the plates 135 and 136 to recede from each other. Electromagnets 162 and 163 are arranged to be energized from an electric supply source (not shown) through conductors 164, 165, when the electric switch 166 is closed. The plates 135 and 136 are linked with the armatures of the electromagnets 162 and 163 in such a manner, that when the electromagnets are energized, the plates 135 and 136 are forced to approach each other against the action of the springs 160 and 161 or the like. A cam surface 170 is fixed on the frame 137 and cooperates with a roller 171 on a lever 172 which is mounted on the carrier 142 and operates the switch 166. The lever 172 is urged into its vertical position by the action of a spring 167. Another electric switch 173 is provided which is adapted to be operated by a second lever 174 mounted on the carrier 142 and carrying a roller 175, the lever 174 being urged into its vertical position by the action of a spring 177. When the switch 173 is closed, valve 168 is opened by an electromagnet 1681 and causes filling material to be discharged from a tank (not shown) through the hollow piercing device 130 in the same manner as previously described with reference to Figs. 4, 5 and 6.

Figures 9, 10:
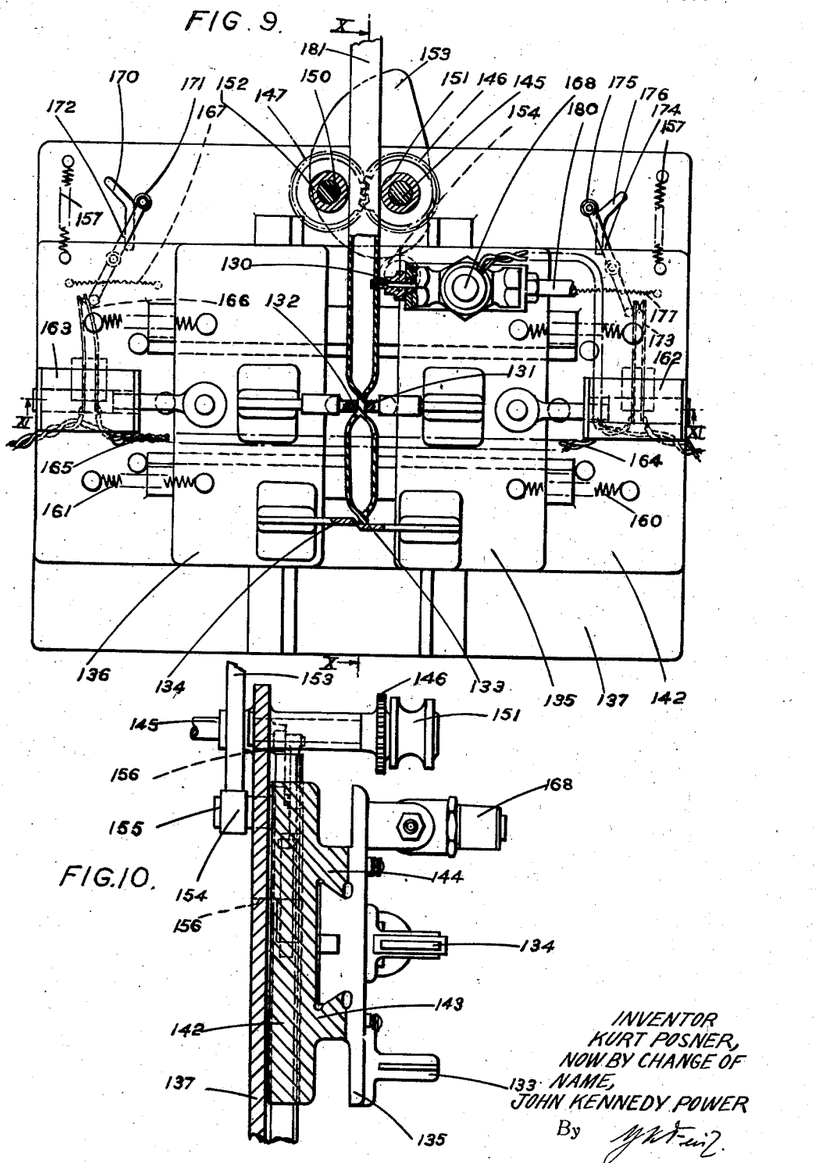
Fig. 9 is a view, partly in section, of an embodiment in which the tools follow the tube while it is passed continuously through the arrangement.
Fig. 10 is a section along the lines X—X of Fig. 9.
Figure 11:
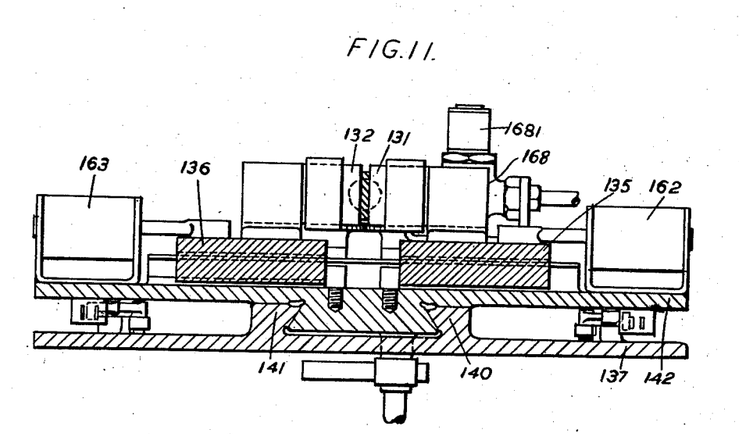
Fig. 11 is a section along the lines XI—XI of Fig. 9.
Figure 12:
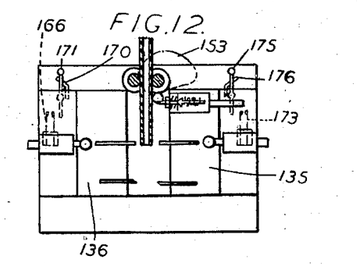
Figs. 12, 13, 14, 15 and 16 show, somewhat diagrammatically, part of the embodiment illustrated in Figs. 9 to 11 in different working positions.
Figure 13:
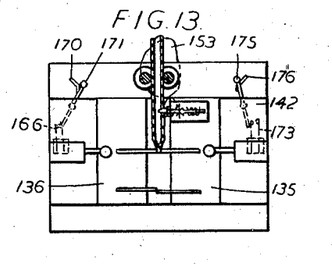
Figure 14:
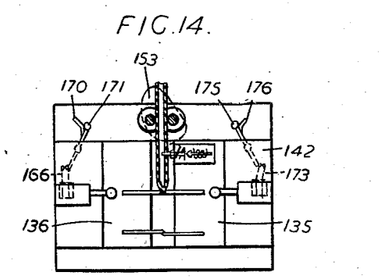
Figure 15:
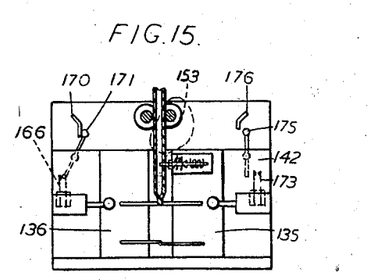
Figure 16:
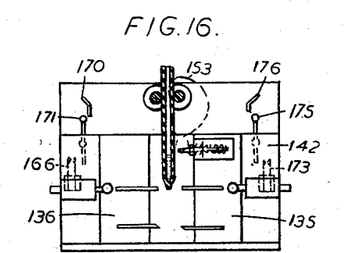

To describe the operation of the mechanism reference will now also be made to Figs. 12 to 16 which illustrate different working positions of the mechanism, the position shown in Fig. 13 corresponding to that of Fig. 9. When the shaft 145 is continuously rotated, the guide rollers 151 and 152 pass continuously a tube 181 of plastic material through the mechanism. The cam 153 is rotated continuously with the shaft 145 and causes, as will easily be understood, the carrier 142, and therewith the plates 135 and 136 and the various tools thereon, to move up and down, the cam 153 being so designed that the speed of the downwards movement substantially equals the speed of the tube 181 passing through the mechanism. In the position illustrated in Fig. 12, the carrier is in its uppermost position, the rollers 171 and 175 are clear of the cam surfaces 170 and 176 and the switches 166 and 173 are open. The electromagnets 162 and 163 (Fig. 9) are de-energized and the plates 135 and 136 are farthest away from each other. The rotation of the guide rollers 151, 152 and the cam 153 causes the leading end of the tube 181 and the carrier 142 to move downwards with approximately the same speed. The roller 171 engages the cam surface 170 and the roller 175 engages the cam surface 176. In the position shown in Fig. 13 the switch 166 is closed while the switch 173 is still open. The closing of the switch 166 causes the electromagnet 162 and 163 to be energized, whereby the plates 135 and 136 are forced into their closest position, the leading end of the tube 181 being squeezed together and closed by the tools 131 and 132 and the tube being pierced by the piercing device 130. On further rotation of the guide rollers 151, 152 and the cam 153, the tube 181, the carrier 142 with the plates 135 and 136 and the tools carried by them, move further downwards until, in the position shown in Fig. 14, the switch 173 is closed by the action of the cam surface 176 on the roller 175, while the switch 166 remains closed. The closing of the switch 173 causes filling material to be discharged through the hollow piercing device 130 into the tube 181, where it rests on the closed region of the tube. On further rotation of the guide rollers 151, 152 and the cam 153, the tube 181 and the carrier 142, with the plates 135, 136 and the tools move further downwards until, in the position shown in Fig. 15, the switch 173 is opened, and the lever carrying the roller 175 assumes its vertical position under the action of the spring 177, whereby the discharge of filling material into the tube is interrupted, while the switch 166 remains still closed. On further rotation of the guide rollers 151, 152 and the cam 153, the tube 181, the carrier 142, the plates 135 and 136 and the tools move still further downwards until, in the position shown in Fig. 16, the switch 166 is also opened, and the lever 172 carrying the roller 171 assumes its vertical position under the action of the spring 167. By opening the switch 166, the electromagnets 162 and 163 are de-energized and the plates 135 and 136 recede from each other under the action of the springs 160 and 161. Thereby the piercing device 130 and the squeezing tools 131 and 132 become clear of the tube 181. On further rotation of the guide rollers 151 and 152 and the cam 153, the tube 181 moves further downwards, while now the carrier 142 and with it the plates 135 and 136 together with the tools attached thereto move upwards, the springs or the like 157 urging the carrier 142 upwards and causing the roller 154 to bear against the cam 153. During this upwards movement the rollers 171 and 175 slide past the cam surfaces 170 and 176 respectively. The arrangement finally assumes the position shown in Fig. 12 and is ready for the next cycle of operation during which the tube 181 is squeezed together and closed at a second region as illustrated in Fig. 9. The hole previously pierced into the tube by the piercing device 130 is located substantially at this second region and is sealed during the squeezing and closing process. When the position of Fig. 15 (or Fig. 9) is reached during the third (or any further) cycle, the cutting tools 133 and 134 cut the tube 181 at the said second (or any subsequent) region thereby either severing filled capsules from the tube or indenting, scoring or perforating the tube so as to manufacture a string of interconnected tubes as has been more fully explained hereinbefore.

Figure 17:
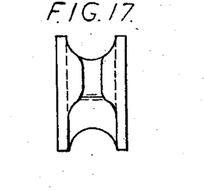
Fig. 17 shows a modified detail of the arrangement illustrated in Figs. 1, 2 and 3.
Figure 21:
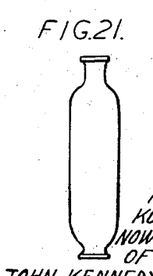
Fig. 21 shows a somewhat differently shaped capsule.

By giving the squeezing tools described a suitable shape, different shapes of the finished capsules can be obtained. For example, if the surfaces of the squeezing tools of Figs. 1, 2 and 3 have the shape of rollers as illustrated in Fig. 17, which act on the tube, capsules having a dome-shaped extension as shown in Fig. 1 may be manufactured.

It should be clearly understood that the accompanying drawings are given by way of example only and that many modifications, omissions and additions are possible, without departing from the spirit of the present invention.

I claim:

1. An apparatus for manufacturing and filling containers made of plastic material comprising means for continuously extruding a tube made of plastic material, said extruding means including an extrusion nozzle adapted to be, in operation, directed downwards, guide rollers for feeding the extruded tube through at least part of the apparatus, means on said guide rollers for applying a marking on the wall of the tube, means for intermittently applying heat and pressure to the tube to close the tube, a hollow mandrel passing through the orifice of said nozzle and extending downwards from said nozzle, a tubular member arranged coaxially with said mandrel within said nozzle so as to form two passages, one being defined by the outer surface of said tubular member and the inner surface of said hollow mandrel, and the other by the inner surface of said tubular member, means adapted to communicate with one of said passages for storing material to be filled into the tube, means for effecting and interrupting the communication between said storing means and said one passage, means communicating with said other passage for controlling the pressure in said tube, means for cutting the tube, and means for timing the operation of the extruding means, guide rollers and marking means, cutting means, and closing means.

2. An apparatus for manufacturing and filling containers made of plastic material comprising means for impelling a tube of plastic material to move in its longitudinal direction, means for intermittently applying heat and pressure to the tube to close the tube, a hollow mandrel arranged to extend in operation, into the tube, a tubular member arranged coaxially with said mandrel so as to form two passages, one being defined by the outer surface of said tubular member and the inner surface of said hollow mandrel, and the other by the inner surface of said tubular member, means adapted to communicate with one of said passages for storing material to be filled into the tube, means for effecting and interrupting the communication between said storing means and said one passage, means communicating with said other passage for controlling the pressure in said tube, means for cutting the tube, and means for timing the operation of the feeding, closing, and cutting means so that the cutting means operate on a previously closed region of the tube.

3. An apparatus as defined in claim 1, and comprising means for heating said nozzle.

4. An apparatus as defined in claim 1, and comprising means for heating said closing means.

5. An apparatus as defined in claim 1, wherein the means for effecting and interrupting the communication between said storing means and said one passage comprise an electro-magnetically operable valve.

6. An apparatus as defined in claim 1, wherein the means for effecting and interrupting the communication between said storing means and said one passage comprise an electro-magnetically operable valve, there being provided an electric switch for operating said valve, a cam surface on one of said guide rollers, and a follower for said cam surface, said follower being arranged on said switch, whereby, alternately, to close and open said switch, and thereby to operate said valve, when said guide rollers are rotated.

KURT POSNER.

REFERENCES CITED

The following references are of record in the file of this patent:

UNITED STATES PATENTS

| Number | Name | Date |
|---|---|---|
| 1,318,292 | Laskey | Oct. 7, 1919 |
| 1,654,647 | Heist | Jan. 3, 1928 |
| 2,141,318 | Salfisberg | Dec. 27, 1938 |
| 2,187,432 | Powers | Jan. 16, 1940 |
| 2,257,823 | Stokes | Oct. 7, 1941 |
| 2,323,581 | Weckesser | July 6, 1943 |
| 2,323,582 | Weckesser | July 6, 1943 |
| 2,325,687 | Kux | Aug. 3, 1943 |
| 2,377,908 | Slaughter | June 12, 1945 |